March 11, 1924.
M. E. DUNLAP
1,486,367
METHOD OF CONTROLLING HUMIDITY OF WORKROOMS
Filed Feb. 5, 1923
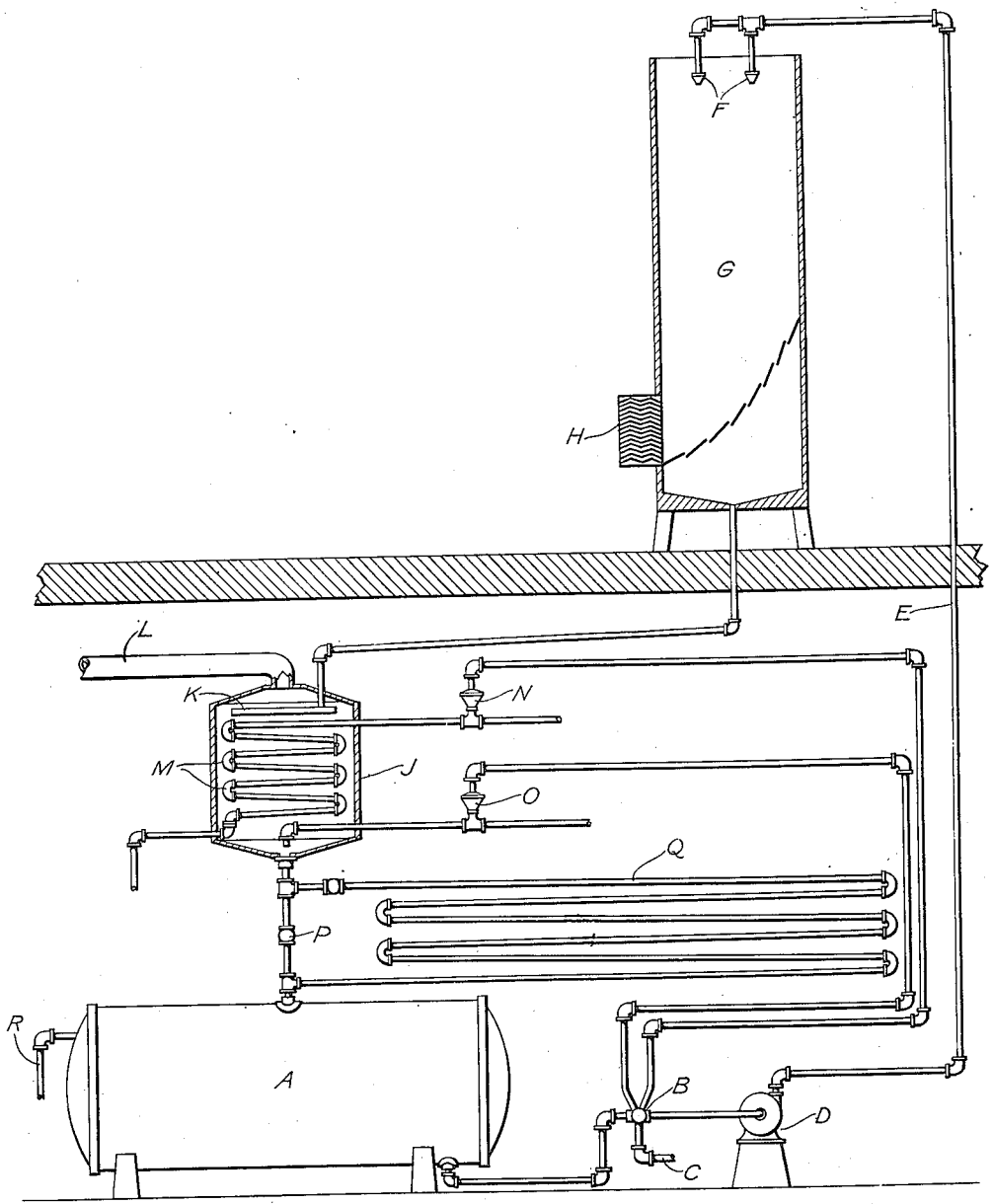

Patented Mar. 11, 1924.                                                           1,486,367

UNITED STATES PATENT OFFICE.

MATTHEW E. DUNLAP, OF MADISON, WISCONSIN.

METHOD OF CONTROLLING HUMIDITY OF WORKROOMS.

Application filed February 5, 1923. Serial No. 617,187.

(FILED UNDER THE ACT OF MARCH 3, 1883, 22 STAT. L., 625.)

*To all whom it may concern:*

Be it known that I, MATTHEW E. DUNLAP, a citizen of the United States, and an employee of the United States Department of Agriculture, residing at Madison, in the county of Dane and State of Wisconsin, have invented a new and useful Improvement in Methods of Controlling the Humidity of Workrooms, of which the following is a specification.

This application is made under the act of March 3, 1883, chapter 143 (22 Stat., 625), and the invention herein described and claimed may be used by the Government of the United States, its officers and employees, and by any person in the United States either in public or private work without payment to me of any royalty thereon. I hereby dedicate the same to the free use of the Government and the people of the United States.

This invention relates to a method of automatically regulating the humidity of workrooms, particularly those in which airplane propellers or other similar products are constructed, which require constant humidity conditions for good manufacturing but which do not require extremely low absolute humidities.

The accompanying drawing indicates the type of apparatus required in carrying out the invention. The drawing is in one figure and shows a side elevation of the apparatus.

In carrying out the method forming the subject matter of this invention, a solution of calcium chloride or a similar hygroscopic salt is made use of which is kept at a constant density by means of an automatic density regulator. The apparatus described herein may be used either for humidifying or dehumidifying the air as may be required. The principle upon which this invention is based is dependent on the fact that solutions of hygroscopic salts come to a definite point of equilibrium with the surrounding atmosphere. By adding water to the solution moisture may be added to the air or on the other hand, if the humidity is higher than is desirable, sufficient moisture will be removed from the air to reduce the relative humidity. Thus, by automatically regulating the specific gravity of the solution used and bringing the solution into contact with the air to be conditioned by means of sprays, an exchange of moisture and an approach to equilibrium is effected.

The use of hygroscopic salts for removing the moisture from air is not new. The novelty of this invention lies in the use of a sprayed solution of a hygroscopic salt, the strength or density of which is regulated automatically so as to produce a desired condition of equilibrium between the air passing through and the solution. This is accomplished at ordinary room temperature, no attempt being made to regulate the temperature of the air, except to lower the temperature of the circulating solution slightly to avoid the additional heating effect produced by the absorption of moisture by the solution.

The apparatus for carrying out this process is indicated in Figure 1. The method described is a simple system in which spray chambers of sufficient size are placed in the rooms or compartments in which the air is to be conditioned and the sprays furnished with solution from a pump located in a lower story. If it is desired the conditioning could be done in a central plant and the conditioned air carried through ducts to the various parts of the building in which it is desired to condition the air.

The apparatus shown consists of the following parts: A, a storage tank of sufficient size to store enough solution for the system; B is the regulator used to control the specific gravity; C, a pipe line leading to the air supply for the regulator; D represents the pump used for circulating the solution, and E the pipe for conveying the solution to the sprays F. G represents the spray chamber of which there may be one or more; H is an eliminator to remove entrained solution from the outgoing air. I is the return pipe leading from the spray chamber G to the distributing trough K in evaporator J. The steam coils M are controlled by valve N. L is a vent to carry off the evaporated moisture. When more water is needed by the apparatus valve O operates to admit it to the lower part of the evaporator J. Q is a cooling coil, P a bypass, and R an overflow and air port.

The operation of the process is as follows: The air enters at the top of the spray chamber G and is circulated through this chamber by the sprays, where it comes into intimate contact with the solution. If the air is dry, water will be removed from the solution and as the strength of the solution is thus increased regulator B will operate valve O and add water to the solution. During seasons of the year when the humidity is high, moisture will be drawn from the air and this will weaken the solution. This condition will operate regulator B in such a way as to open valve N, admitting steam to the coils and the solution flowing over the steam coils will be concentrated by the loss of moisture. The solution after passing through cooler Q is returned to the storage tank A and is ready for use again. The water sprays will not only serve to bring the air passing through them to the desired humidity but will wash the air passing through as well.

Having thus described my invention, I claim:

The herein described method of controlling the humidity of the air by bringing the air into close contact with a sprayed solution of calcium chloride, the density of which is automatically regulated by the addition to said solution of water when the humidity of the air drops below normal and by the partial evaporation of said solution when the humidity of the air tends to rise.

In testimony whereof I affix my signature in the presence of two subscribing witnesses.

MATTHEW E. DUNLAP.

Witnesses:
A. C. LINDAUER,
LEO E. SOMMERS.